US006918328B2

(12) United States Patent
Wohltmann

(10) Patent No.: US 6,918,328 B2
(45) Date of Patent: Jul. 19, 2005

(54) METHOD OF AND APPARATUS FOR COUNTERACTING THE LACK OF BALANCE OF PARTS IN A CUTOFF FOR CIGARETTES AND THE LIKE

(75) Inventor: Cord Wohltmann, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 105 days.

(21) Appl. No.: 09/736,190

(22) Filed: Dec. 15, 2000

(65) Prior Publication Data

US 2002/0124696 A1 Sep. 12, 2002

(30) Foreign Application Priority Data

Dec. 18, 1999 (DE) ........................................ 199 61 254

(51) Int. Cl.[7] ............................ B23D 25/00; A24C 5/28

(52) U.S. Cl. ............................ 83/310; 83/159; 83/339; 83/373; 83/931; 131/84.4; 74/27

(58) Field of Search .......................... 83/931, 310, 339, 83/373, 159; 131/65, 84.1, 84.4; 74/27

(56) References Cited

U.S. PATENT DOCUMENTS

| | | | | | |
|---|---|---|---|---|---|
| 1,487,028 | A | * | 3/1924 | Rundell | 83/310 |
| 3,140,632 | A | * | 7/1964 | Rowlands et al. | 83/310 |
| 3,288,012 | A | * | 11/1966 | Borzym | 83/310 |
| 3,730,034 | A | * | 5/1973 | Preston | 83/310 |
| 3,760,672 | A | * | 9/1973 | Labee et al. | 83/310 |
| 3,782,229 | A | * | 1/1974 | Cristiani | 83/310 |
| 3,830,126 | A | * | 8/1974 | Ringe | 83/310 |
| 3,915,041 | A | * | 10/1975 | Trofimov et al. | 83/310 |
| 4,398,438 | A | * | 8/1983 | Seragnoli | 83/310 |
| 4,412,505 | A | | 11/1983 | Haüsler et al. | |
| 4,444,210 | A | * | 4/1984 | Schumacher | 131/84.1 |
| 4,534,232 | A | | 8/1985 | Stieg | |
| 4,534,252 | A | | 8/1985 | Harrington et al. | |
| 4,893,640 | A | | 1/1990 | Heitmann et al. | |
| 5,050,471 | A | * | 9/1991 | Niemann | 83/310 |
| 5,135,008 | A | | 8/1992 | Oesterling et al. | |
| 5,816,261 | A | * | 10/1998 | Dyett | 131/84.4 |
| 5,992,282 | A | * | 11/1999 | Biondi et al. | 83/310 |

FOREIGN PATENT DOCUMENTS

| | | |
|---|---|---|
| DE | 2 233 064 | 1/1974 |
| GB | 383 391 A | 11/1932 |
| GB | 1 556 267 | 12/1976 |

* cited by examiner

*Primary Examiner*—Stephen Choi
(74) *Attorney, Agent, or Firm*—Venable LLP; Catherine M. Voorhees

(57) ABSTRACT

Lack of balance of a crank mechanism, which reciprocates a ledger having one or more guides for one or more cigarette rods or filter rods each issuing from a maker and being subdivided into a row of cigarettes or filter mouthpieces, is at least partially counteracted by at least two counterpoises one of which orbits about the axis of the crank mechanism in a first direction and the other of which orbits, in a second direction counter to the first direction, about a second axis laterally offset relative to the axis of the crank mechanism. A third counterpoise can be mounted for orbital movement about the axis of the crank mechanism and, if utilized, is angularly offset relative to the first counterpoise. The prime mover for the crank mechanism orbits the first and third counterpoises in the first direction, and the second counterpoise in the second direction.

18 Claims, 4 Drawing Sheets

METHOD OF AND APPARATUS FOR COUNTERACTING THE LACK OF BALANCE OF PARTS IN A CUTOFF FOR CIGARETTES AND THE LIKE

CROSS-REFERENCE TO RELATED CASES

The present application claims the priority of commonly owned copending German patent application Serial No. 199 61 254.4 filed Dec. 18, 1999. The disclosure of the above-referenced German patent application, as well as that of each US and foreign patent and patent application identified in the specification of the present application, is incorporated herein by reference.

BACKGROUND OF THE INVENTION

The invention relates to improvements in methods of and in apparatus for counteracting the lack of balance of cyclically moving parts, particularly for counteracting the lack of balance of parts or groups or assemblies of parts which are caused to reciprocate (move back and forth), often at a high or very high frequency. Still more particularly, the invention relates to improvements in methods of and in apparatus for compensating for the lack of balance of one or more units or parts, such as unbalanced drives, which are set up to impart reciprocatory (back-and-forth) movements to components of machines, production lines or the like.

It is customary to mass produce rod-shaped smokers' products by forming a continuous rod which is advanced lengthwise along a predetermined path (e.g., along a horizontal or substantially horizontal path), and by repeatedly severing the leader of the advancing rod by a knife or another suitable cutter which forms part of a so-called cutoff and is caused to move across a selected portion of the path. In order to ensure that the cutter will make clean cuts across the advancing rod, at least that portion of the cutoff which directly supports the cutter is caused to move back and forth in and counter to the direction of forward movement of the rod and to cause the cutter to sever the rod while the cutter moves in the direction of forward movement and at the exact speed of the rod. Such cutoffs are utilized, for example, to subdivide a continuously moving filter rod into a file or row of discrete filter rod sections, filter plugs or filter mouthpieces of unit length or multiple unit length, or to subdivide a continuously moving tobacco-containing rod into plain cigarettes, cigarillos, cigars or like rod-shaped smokers' products of unit length or multiple unit length. Analogous cutoffs can be employed with similar advantage to subdivide a running continuous tube (such as a cylinder of cardboard or the like) into discrete tubes of unit length or multiple unit length.

In certain modern cigarette makers, a single cutoff or a group of discrete cutoffs can be set up to simultaneously sever two or more parallel continuous rods into rows or files of discrete rod-shaped smokers' products which are introduced into one or more packing machines or into one or more so-called tipping machines wherein (if the ultimate products are filter cigarettes) pairs of coaxial plain cigarettes of unit length are assembled with filter mouthpieces of double unit length to form therewith filter cigarettes of double unit length. Such filter cigarettes of double unit length are severed midway across their filter mouthpieces to yield pairs of filter cigarettes of unit length.

Reference may be had, for example, to commonly owned U.S. Pat. No. 5,135,008 granted Aug. 4, 1992 to Oesterling et al. for "METHOD OF AND APPARATUS FOR MAKING FILTER CIGARETTES". Filter rod sections of double unit length can be supplied to the apparatus of Oesterling et al. by a machine of the type disclosed, for example, in U.S. Pat. No. 4,412,505 granted Nov. 1, 1983 to Häusler et al. for "APPARATUS FOR APPLYING ATOMIZED LIQUID TO A RUNNING LAYER OF FILAMENTARY MATERIAL OR THE LIKE". The apparatus of Oesterling et al. can receive plain cigarettes from a so-called SE rod maker which is distributed by the assignee of the present application. A more recent version, known as SE 2 rod maker, turns out two rows of plain cigarettes which can be fed to a so-called MAX 2 filter assembler distributed by the assignee of the present application. This filter assembler is a filter tipping machine and is or can be of the type disclosed in the aforementioned US patent to Oesterling et al. The SE 2 rod maker can be of the type disclosed, for example, in commonly owned U.S. Pat. No. 4,893,640 granted Jan. 16, 1990 to Heitmann et al. for "MULTIPLE-ROD CIGARETTE MAKING MACHINE".

The device which guides successive increments of a single continuous rod or of several parallel continuous rods through the severing or subdividing station is known as tube or ledger. This ledger is often provided with a slot which guides the cutter of the cutoff during actual severing of the running rod or rods. Reference may be had, for example, to British patent No. 1,556,267, to German patent No. 2 233 064 and to U.S. Pat. No. 4,534,232 granted Aug. 13, 1985 to Harrington et al. for "LEDGER FOR CUT-OFF DEVICES IN CIGARETTE MACHINES".

In many instances, the drive which moves the ledger for the continuously running rod or rods and, in many instances, the cutter or cutters of the cutoff back and forth along a preselected portion (severing station) of the path for the rod or rods employs a crank mechanism. Such mechanism is unbalanced and, therefore, the drive includes or cooperates with a counterbalance, counterweight or counterpoise (hereinafter called counterpoise) which is caused to rotate with a rotary part of the mechanism. That portion of the ledger which flanks the path for the knife constitutes or acts not unlike a counterknife to enhance the quality of the severing action and to thus further ensure that the cutter can make clean cuts across the tubular wrapper as well as across the rod-like filler of each continuously running rod. The aforementioned slot of the ledger is located in a plane which is normal to the direction of forward movement of the rod or rods (i.e., at right angles to the axis or axes of the rod or rods).

If the unbalanced drive for the ledger is or includes a crank mechanism, a crank arm of such mechanism is pivotably affixed to the ledger to reciprocate the latter in synchronism with the knife holder. Such drives for the ledger have found widespread acceptance in the tobacco processing industry. It has been ascertained that a crank mechanism is highly satisfactory as a means for reciprocating the ledger in synchronism with the cutter or cutters of the cutoff in a cigarette making or filter rod making machine, as long as the frequency of reciprocatory movement of the ledger is below a certain upper threshold value. However, once the frequency of reciprocatory movements of the ledger exceeds such upper threshold value (e.g., in a machine which turns out 16,000 or more plain cigarettes per minute), the presently known systems which are intended to compensate for the lack of balance of the drive for the ledger cannot ensure adequate counterbalancing of a crank mechanism. The result is that the rotating or orbiting parts perform pronounced vibratory or oscillatory movements which entail excessive vibrations of the floor, the generation of highly unpleasant body-transmitted vibration (noise), adverse influencing of the neighboring system(s) including electrotechnical components, and/or others.

The situation is aggravated because the axis of rotation of the crank mechanism is not located in the plane of forward movement of the rod or rods. Such positioning of the axis of rotation is neither desirable nor possible for constructive and other reasons (such as because this would adversely affect the quality of the severing action), i.e., it is not possible (with heretofore employed compensating means) to adequately counteract vibrations of that frequency and intensity which develop when the frequency of reciprocatory movements of the ledger (and hence of the cutter or cutters) exceeds the aforementioned threshold value. On the other hand, it is highly advisable to adequately compensate for or counteract the vibratory or oscillatory movements which develop when the reciprocatory movements of the drive reach a frequency which is required in a modern high-speed production line for filter cigarettes and the like.

The just discussed problems cannot be solved, or cannot be adequately solved, by proposals which are described in the aforementioned British and German patents and in the aforementioned U.S. Pat. No. 4,534,252 to Harrington et al. Such prior proposals are satisfactory when the ledger is called upon to reciprocate within a certain range of frequencies but they cannot eliminate or adequately reduce the generation of noise, vibrations of the floor, undesirable stray movements of neighboring units and/or other undesirable phenomena attributable to the need for high-frequency oscillations of the ledger, of the cutter or cutters and of certain other parts such as those which impart movements to the ledger and/or to the cutter(s).

OBJECTS OF THE INVENTION

An object of the present invention is to provide a method which renders it possible to oscillate a ledger, one or more cutters and/or other parts at a frequency exceeding those frequencies which can be imparted to such parts by presently known drives without risking the development of unpleasant working conditions (such as those attributable to excessive noise and/or excessive vibrations of floors, walls and the like) and/or damage to and/or unsatisfactory functioning of machine components located next to the oscillated part or parts.

Another object of the invention is to provide a method which can be practiced by resorting to a small number of simple and inexpensive parts.

A further object of the instant invention is to provide a novel and improved crank mechanism for use in production lines which are employed for the making of rod-shaped smokers' products and wherein one or more parts must be reciprocated at frequencies well in excess of 10,000 per minute.

An additional object of the invention is to provide a novel and improved arrangement which can compensate for the lack of balance of drives (e.g., those employing crank mechanisms) which are utilized to reciprocate cutters and/or ledgers or other suitable guides for continuous rods containing filter material for tobacco smoke, natural or reconstituted or artificial tobacco and the like.

Still another object of the invention is to provide a novel and improved combination of counterpoises for use in or in conjunction with an unbalanced crank drive.

A further object of the invention is to provide a novel and improved guide for filter rods, cigarette rods and other types of elongated products (such as tubes) which are utilized in and/or are turned out by production lines for smokers' products.

Another object of the invention is to provide a novel and improved apparatus for reducing the undesirable effects of vibrations of parts which must vibrate at a frequency well in excess of that which is acceptable in heretofore known tobacco processing and/or other machines.

SUMMARY OF THE INVENTION

One feature of the present invention resides in the provision of a method of counteracting the lack of balance for a rotary drive (such as a crank mechanism) for a recirocable ledger which guides at least one continuous rod advancing lengthwise in a predetermined direction, at a predetermined speed and along a predetermined path and being repeatedly severed by an implement which moves cyclically in and counter to the predetermined direction and is arranged to sever the rod while advancing along a portion of the predetermined path, at the predetermined speed and in the predetermined direction. The improved method comprises the steps of orbiting a ledger-reciprocating component of the drive and a first counterpoise for the drive about a first axis, and orbiting a second counterpoise for the drive in synchronism with the first counterpoise about a second axis which is remote from the first axis.

The method can further comprise the steps of establishing a torque-transmitting connection between the drive and at least one further counterpoise, and orbiting the at least one further counterpoise in synchronism with the first counterpoise. The orbiting steps can include orbiting the first, second and further counterpoises about at least substantially parallel axes. The step of orbiting the at least one further counterpoise can include orbiting the at least one further counterpoise about the first axis.

The first and second axes are or can be parallel to each other, and the step of orbiting the second counterpoise can include transmitting torque from the drive to the second counterpoise.

The orbiting steps can include causing one of the first and second counterpoises to orbit about the respective axis in a clockwise direction, and causing the other of the first and second counterpoises to orbit about the respective axis in a counterclockwise direction.

The rod can constitute a tube, a rod containing filter material (such as acetate fibers) for tobacco smoke, or a rod containing smokable material (such as shreds of natural, reconstituted and/or artificial tobacco).

Another feature of the present invention resides in the provision of an apparatus for subdividing at least one running rod into sections of predetermined length. The improved apparatus comprises an unbalanced drive including an output member (such as a shaft) which is rotatable about a first axis, a mobile ledger which serves to guide the at least one rod and is reciprocable back and forth in and counter to a predetermined direction and receives motion from the output member, and means for compensating for the lack of balance of the drive. The compensating means includes a first counterpoise which is arranged to orbit about the first axis, and a second counterpoise which is arranged to orbit about a second axis in synchronism with the first counterpoise. The second axis is spaced apart from the first axis.

The apparatus further comprises at least one subdividing or severing implement which is arranged to reciprocate with the ledger and to sever the at least one rod during movement in the predetermined direction.

The unbalanced drive can include a crank mechanism having a crank arm which couples the ledger with the output member. The arrangement is preferably such that a first portion (e.g., a first end portion) of the crank arm is installed to orbit about the first axis, and that a second portion (e.g., a second end portion) of the crank arm is connected with the ledger. Such ledger can include at least one guide for the at least one rod and a flexible carrier for the at least one guide; such carrier can include one or more leaf springs.

The improved apparatus can further comprise a shaft which is rotatable about the second axis and supports the second counterpoise, and means for rotating the shaft in synchronism with the output member; such rotating means can comprise an endless flexible torque transmitting element, e.g., a V-belt. The arrangement is preferably such that the output member of the drive is mounted for rotation in a first direction (clockwise or counterclockwise) and the means for rotating the shaft is installed and operated to rotate the shaft in a second direction counter to the first direction.

The compensating means of the improved apparatus can further include at least one further counterpoise and means for orbiting the at least one further counterpoise in synchronism with one of the first and second counterpoises. The means for orbiting the at least one further counterpoise can include a kinematic connection between the output member of the drive and the at least one further counterpoise. The latter can be eccentrically mounted on an additional shaft which is rotatable by the output member of the drive about a further axis spaced apart from the second axis. The further axis can coincide with the first or second axis. For example, the at least one further counterpoise can be arranged to orbit about the first axis and can be spaced apart from the first counterpoise in the direction of the first axis. Such at least one further counterpoise can be angularly offset relative to the first counterpoise, as seen circumferentially of the first axis.

The centers of gravity of the first and second counterpoises can be disposed in a common plane, e.g., in a vertical plane.

The ledger can comprise a single substantially tubular guide if the improved apparatus is set up to subdivide a single running rod, or a plurality of substantially tubular guides, one of each of two or more discrete rods. Such plural guides can be borne by a common flexible carrier, e.g., a carrier including two or more leaf springs.

The novel features which are considered as characteristic of the invention are set forth in particular in the appended claims. The improved subdividing apparatus itself, however, both as to its construction and the modes of assembling, installing and utilizing the same, together with numerous additional important features and attributes thereof, will be best understood upon perusal of the following detailed description of certain presently preferred specific embodiments with reference to the accompanying drawings.

DESCRIPTION OF PREFERRED EMBODIMENTS

Figure 1:
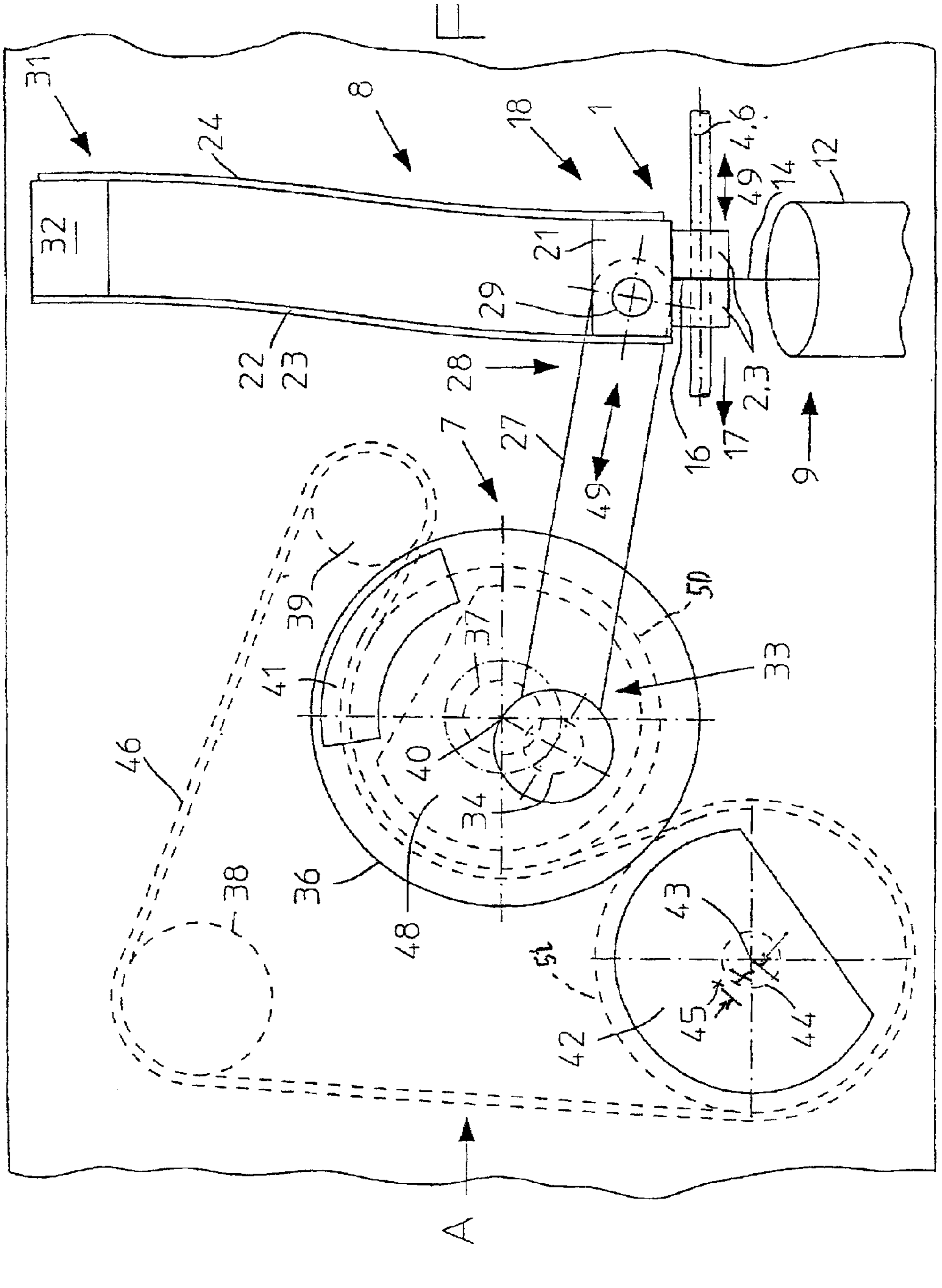
FIG. 1 is a fragmentary front elevational view of the discharge end of a machine which is designed to simultaneously turn out two cigarette rods and wherein the cutoff for the two rods cooperates with a mobile ledger receiving motion from a drive which is balanced in accordance with the present invention.
Figure 2:
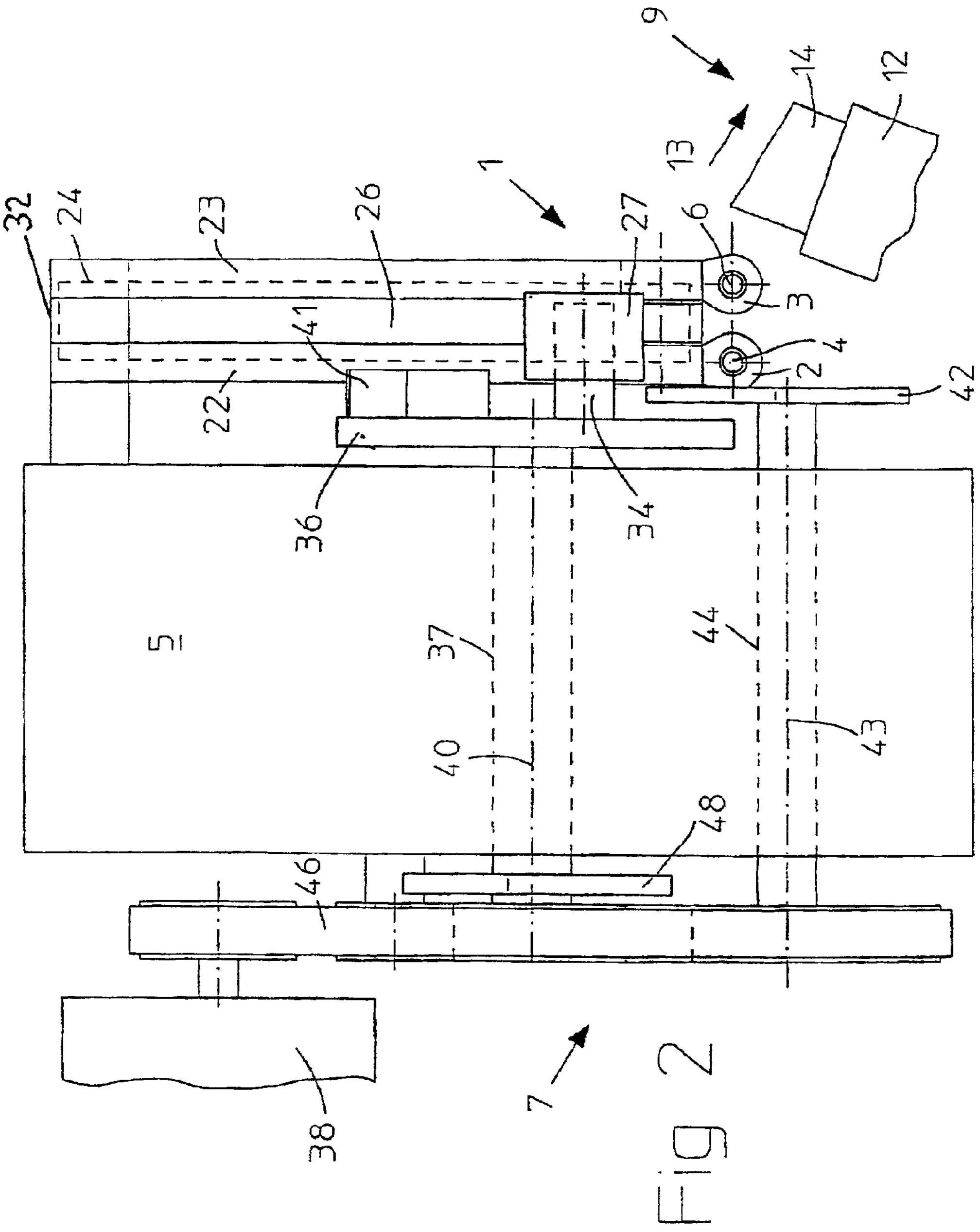
FIG. 2 is a fragmentary side elevational view of the machine as seen in the direction of arrow A in FIG. 1.

FIGS. 1 and 2 show certain details of a cigarette rod making mchine 5 which is designed to turn out two continuous cigarette rods 4 and 6 advancing along two parallel or substantially parallel paths in the direction indicated by an arrow 17. Portions of such paths are defined by a mobile ledger 1 which is reciprocable in directions indicated by the double-headed arrow 49. This ledger comprises two tubular guides 2, 3 which are mounted on and are reciprocable with a common flexible carrier 8. The guides 2, 3 respectively have holes which establish portions of the paths for the rods 4 and 6.

The means for reciprocating the carrier 8 back and forth comprises an unbalanced drive 7 which, in the embodiment of FIGS. 1 and 2, includes a crank mechanism having a rotary output member 37 here shown as a horizontal shaft with an axis 40 which is normal to and crosses in space with the axes of the cigarette rods 4 and 6.

The cigarette rod making machine 5 can be of the type known as PROTOS 2 which is distributed by the assignee of the present application. Certain details of such machine are described and shown in the aforementioned U.S. Pat. No. 4,893,640 to Heitmann et al. This machine further comprises a severing or subdividing unit or cutoff 9 having at least one severing implement 14 (hereinafter called cutter) which shares the movements of the guides 2, 3 in the directions indicated by the arrow 49 and severs the cigarette rods 4, 6 while moving, in the direction of the arrow 17, at the exact speed of the rods and the carrier 8 for the guides. The ledger 1 has a composite slot 16 which includes coplanar portions provided in the guides 2, 3 and receiving the cutter 14 when the latter is caused to move across the paths for the rods 4 and 6, i.e., during actual severing of the leaders of the rods so as to form two series or files or rows of aligned plain cigarettes, e.g., cigarettes of unit length or double unit length which can be fed to a processing machine. The processing machine can constitute a tipping machine of the character disclosed in the aforementioned U.S. Pat. No. 5,135,008 to Oesterling et al. The tipping machine assembles pairs of coaxial plain cigarettes of unit length with discrete filter mouthpieces of double unit length into filter cigarettes of double unit length. Each filter cigarette of double unit length is severed midway across the filter mouthpiece of double unit length to yield two filter cigarettes of unit length.

The cutter 14 of the cutoff 9 can receive motion from the crank mechanism 7 or from another unit of the cigarette rod making machine 5 in a manner not forming part of the present invention. All that counts is to ensure that the cutter 14 move in the direction of the 5 arrow 17 and at the exact speed of the cigarette rods 4, 6 while moving through the composite slot 16 provided therefor in the guides 2, 3 of the ledger 1. The reference character 12 denotes a holder or housing which receives motion (from the crank mechanism 7 or from another driving unit) to cause the cutter 14 to orbit (see the arrow 13) along a path extending in part through the composite slot 16; the cutter 14 moves through the slot 16 when its speed (in the direction indicated by the arrow 17) matches the speed of the cigarette rods 4 and 6. It is also possible to employ a cutoff with two cutters, one for each of the rods 4 and 6.

The ledger 1 further comprises a reciprocal support 21 which is rigid or of one piece with the guides 2, 3 and forms part of the flexible carrier 8. The latter further includes three elongated leaf springs 22, 23, 24 which carry the support 21 (at 18) and are mounted (at 31) on a stationary supporting component 32. The crank mechanism 7 has a crank arm 27 one end portion 28 of which is secured to the support 21 by a pin-shaped connector 29 and the other end portion 33 of which is affixed to a disc 36 of the mechanism 7 by a crank pin 34. The axis of the crank pin 34 is parallel to the axis 40 of the output member 37 of the crank mechanism 7. The axis 40 is parallel to the axis of the crank pin 34 and the latter orbits about the axis 40 when the crank mechanism 7 is on, namely when the prime mover 38 (e.g., an electric motor) drives the disc 36 by way of an endless flexible element (e.g. a V-belt) 46. The disc 36 can include a pulley or sheave 50 for the V-belt 46.

The leaf springs 22, 23 and 24 of the carrier 8 (the latter acts as a reciprocable follower) can be made of a suitable epoxy resin which is or can be reinforced by carbon filaments (or in another suitable manner) and enables the guides 2, 3 of the ledger 1 to carry out the required reciprocatory movements indicated by the arrow 49. The clearance 26 which is defined by the leaf springs 22, 23 enables the end portion 28 of the crank arm 27 to engage the connector 29 and to move the support 21 and the guides 2, 3 of the ledger 1 back and forth (arrow 49) when the motor 38 is on.

When the V-belt 46 drives the disc 36 and the pulley 50 to rotate the output member 37 about the axis 40, the disc 36 causes the crank pin 34 and the end portion 33 of the crank arm 27 to orbit about the axis 40 and to thus cause the end portion 28 of the crank arm to reciprocate the ledger 1 in the directions indicated by the arrow 49.

The disc 36 carries an arcuate first counterpoise 41 which orbits about the axis 40 when the drive 7 is on. This compensates in part for the lack of balance of the drive 7, namely for some of the inertia forces of the first order. Since the axis 40 of output member 37 is not, and could and should not be, located in the planes of the axes of the cigarette rods 4 and 6 for structural reasons and for the reasons related to the severing of the rods, the first counterpoise 41 cannot by itsef fully compensate for the lack of balance of the drive 7.

In accordance with a feature of the present invention, the means for compensating for the lack of balance of the drive 7 further comprises a second counterpoise 42 mounted on a shaft 44 in such a way that its center of gravity 45 is radially offset relative to the axis 43 of shaft 44. The axis 43 is parallel to the axis 40 of the output member 37, and the counterpoise 42 is arranged to orbit about the axis 43 in synchronism with the orbital movement of the counterpoise 41 about the axis 40. The movements of the counterpoise 42 in synchronism with those of the counterpoise 41 are ensured by the V-belt 46 which is trained over the aforementioned pulley 50 including or constituted by or forming part of the disc 36, and about a second pulley 51 carried by the shaft 44. The V-belt 46 is trained over the pulleys 50, 51 in such a way that the counterpoise 41 orbits (about the axis 40) in a clockwise direction whereas the counterpoise 42 orbits (about the axis 43) in a counterclockwise direction, or vice versa.

The distance x between the center of gravity 45 of the second counterpoise 42 and the axis 43 of the shaft 44 influences the balancing action of the second counterpoise 42. The center of gravity 45 is preferably coplanar with that of the first counterpoise 41. If the axes of the cigarette rods 4 and 6 are located in a horizontal plane, the common plane of the center of gravity 45 and the center of gravity of the counterpoise 41 is a vertical plane.

The V-belt 46 cooperates with the pulleys 50, 51 to establish a kinematic connection between the shafts 37 ad 44, i.e., the RPM of the shaft 37 matches that of the shaft 44. The belt 46 is further trained over a third pulley 39 which ensures that the shafts 37 and 44 are driven to rotate in opposite directions. The just described kinematic connection between the shafts 37, 44 (and hence between the counterpoises 41, 42) ensures that the lack of balance of the drive 7 is compensated for to a much greater extent than in the absence of the shaft 44 and counterpoise 42. Such more pronounced compensation for the lack of balance of the drive 7 entails a pronounced reduction of vibrations which are transmitted to the floor for the machine 5 and to parts of the machine 5 and/or to other machines or units of the production line including such machine. The reduction of vibrations brings about a number of important advantages all of which were enumerated hereinbefore and include a pronounced reduction of noise, longer useful life, infrequent need for a slowdown or temporary stoppage and others.

In accordance with an additional important feature of the invention, the lack of balance of the drive 7 can be compensated for to an even greater extent by the provision of an optional but highly desirable and advantageous further (third) counterpoise 48 which is orbited by the prime mover 38 by way of the V-belt 46 and shaft 37. The counterpoise 48 orbits about the axis 40 and is angularly offset relative to the counterpoise 41. FIG. 2 shows that the counterpoises 41, 48 are spaced apart from each other as seen in the direction of the axis 40, and that such counterpoises are angularly offset as seen circumferentially of the axis 40 of the output member 37.

When the prime mover 38 is on, the V-belt 46, the output member 37 and the disc 36 cause the crank pin 34 to orbit about the axis 40 so that the support 21 moves the ledger 1 back and forth as indicated by the double-headed arrow 49, i.e., in and counter to the direction (arrow 17) of forward movement of the cigarette rods 4 and 6. The cutter 14 is caused to sever the rods 4 and 6 while the guides 2, 3 advance in the direction of the arrow 17 at the exact speed of the cigarette rods; the blade of the cutter 14 cooperates with two pairs of counterknives constituted by those portions of the guides 2, 3 which flank the respective portions of the composite slot 16.

Figure 3:
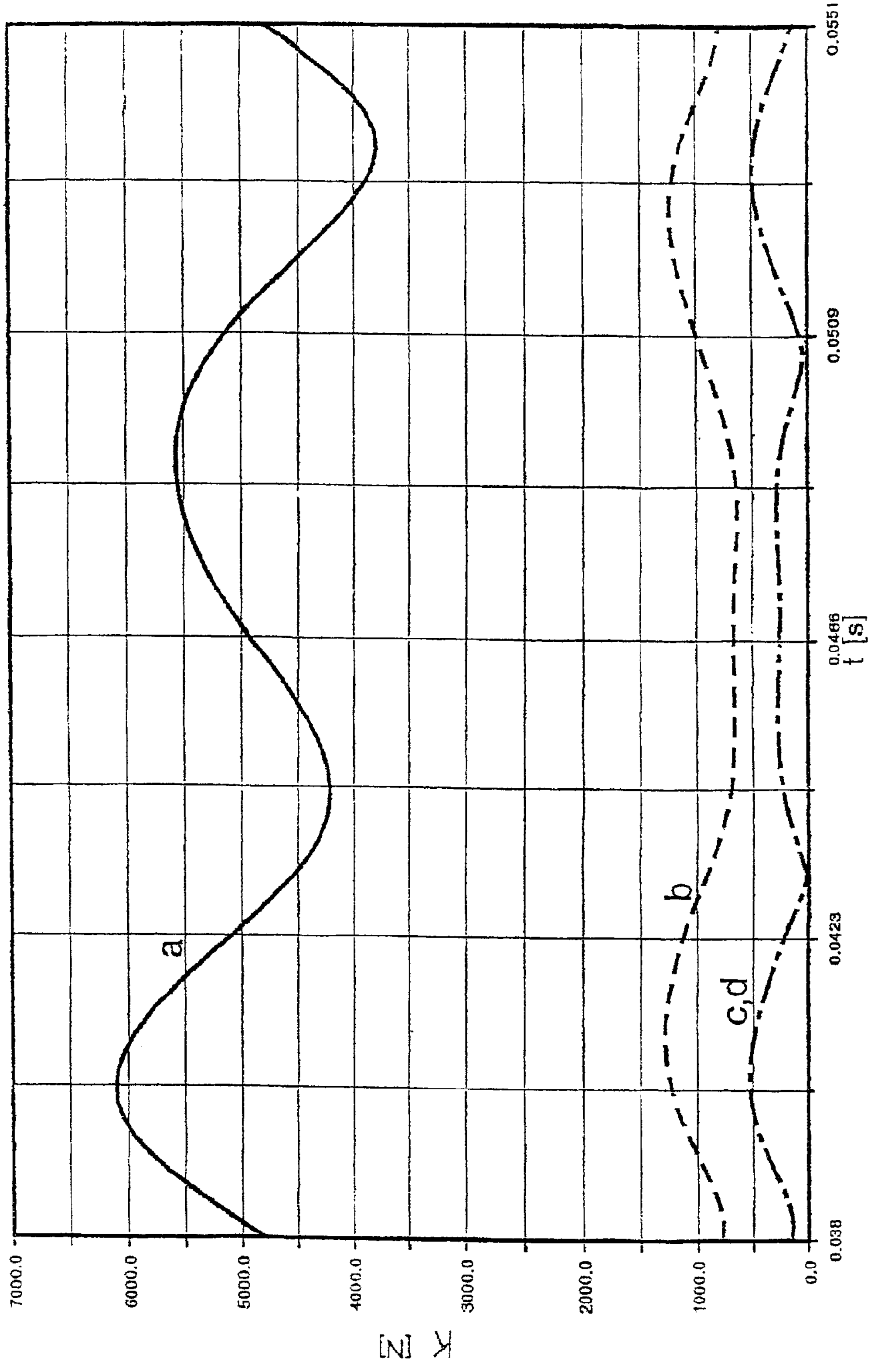
FIG. 3 is a coordinate system wherein the curves represent the magnitudes of undesirable forces which are generated by the machine of FIGS. 1 and 2 when such machine is respectively equipped with and is devoid of the apparatus embodying the present invention.

The curves in the coordinate system of FIG. 3 represent the variations of forces acting upon the machine 5 when this machine is set up to furnish two files or rows of plain cigarettes each having a length of 130 mm and to cause the ledger 1 to reciprocate (i.e., to move back and forth) at a frequency of 3500 per minute. The magnitude of the force K (in N) is measured along the ordinate, and the time (t) is measured along the abscissa.

The curve a represents the variations of the force K in the absence of the counterpoises 41, 42 and 48. The broken-line curve b denotes variations of the force K when the lack of balance of the drive 7 is compensated for solely by the counterpoise 41. The dot-dash line curve c, d denotes the variations of the force K when the lack of balance of the drive 7 is compensated for by the counterpoises 41, 42 and 48. It will be seen that the magnitude of the force K acting upon the machine 5 and/or upon the floor for such machine is reduced significantly by the provision of the counterpoise 48 and/or 42. In fact, the magnitude of the force K is reduced by up to 70% if the counterpoise 48 and/or 42 is utilized in addition to the counterpoise 41.

Figure 4:
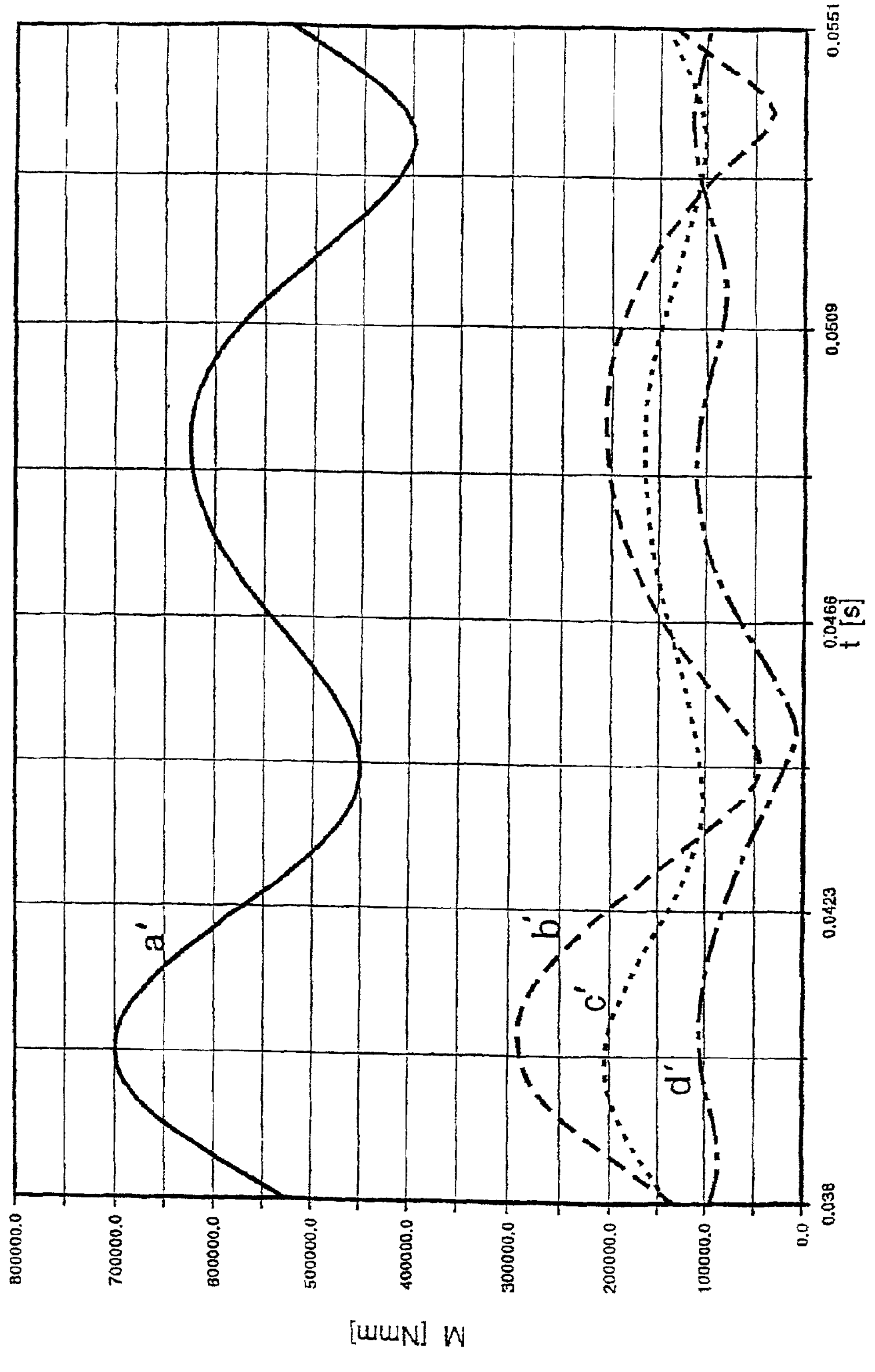
FIG. 4 is a coordinate system corresponding to that of FIG. 3 except that the curves denote changes of the undesirable torque which is generated when the machine of FIGS. 1 and 2 is and is not equipped or associated with the improved apparatus.

In the coordinate system of FIG. 4, the torque M (in N per mm) being transmitted to certain parts of the machine 5 is measured along the ordinate, and the time t is measured along the abscissa. It is again assumed that the machine 5 turns out plain cigarettes each having a length of 130 mm (i.e., twice the length of certain types of plain cigarettes of unit length), and that the ledger 1 is reciprocated at a frequency of 3500 back-and-forth movements per minute.

The solid-line curve a' denotes the magnitude and the variations of torque M in the absence of any means for compensating for the lack of balance of the drive 7. The broken-line curve b' denotes the magnitude and the variations of torque M as a function of time when the cigarette making machine 5 employs only the counterpoise 41; the dotted-line curve c' denotes the magnitude and the variations of the torque M when the machine 5 embodies the counterpoises 41 and 42; and the dot-dash line curve d' denotes the magnitude and the variations of the torque M when the machine 5 employs the counterpoises 41, 42 and 48.

A comparison of the curves a', b', c' and d' indicates that the utilization of the additional counterpoises 42 and 48 results in a significant reduction of torque M, namely a reduction of up to 40% in comparison with the magnitude of torque which is being transmitted when the machine 5 employs only the counterpoise 41.

As utilized in this specification and in the appended claims, the term "in synchronism" is intended to denote that the RPM of the output member 37 (the first counterpoise 41 orbits about the axis 40 of this shaft) is the same as that of the shaft 44 (the second counterpoise 42 orbits about the axis 43 of the shaft 44). However, the direction of orbital movement of the counterpoise 41 is counter to that of the second counterpoise 42.

The improved apparatus can be utilized with equal advantage in machines which are designed to turn out a single continuous rod (e.g., a single cigarette rod 4 or 6). Furthermore, the apparatus can be utilized for the severing of continuous filter rods or tubes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of cutoffs for cigarette rods and the like and, therefore, such adaptations should and are intended to be comprehended within the meaning and range of equivalence of the appended claims.

What is claimed is:

1. Apparatus for subdividing at least one running rod into sections of predetermined length, comprising:

an unbalanced drive including an output member rotatable about a first axis;

a mobile ledger for the at least one rod, said ledger being reciprocal back and forth in and counter to a predetermined direction and receiving motion from said output member;

an arrangement for compensating for the lack of balance of said drive, including a first counterpoise arranged to orbit about said first axis, a second counterpoise arranged to orbit about a second axis in synchronism with said first counterpoise, said second axis being spaced apart from said first axis; and a shaft rotatable about said second axis and mounting said second counterpoise, and means for rotating said shaft in synchronism with said output member, wherein said output member is arranged to rotate in a first direction and said means for rotating includes means for rotating said shaft in a second direction counter to said first direction.

2. Apparatus for subdividing at least one running rod into sections of predetermined length, comprising:

an unbalanced drive including an output member rotatable about a first axis;

a mobile ledger for the at least one rod, said ledger being reciprocal back and forth in and counter to a predetermined direction and receiving motion from said output member, said ledger moving along an essentially linear path; and an arrangement for compensating for the lack of balance of said drive, including a first counterpoise arranged to orbit about said first axis, and a second counterpoise arranged to orbit about a second axis in synchronism with said first counterpoise, said second axis being spaced apart from said first axis, wherein said compensating means further includes at least one further counterpoise and means for orbiting said at least one further counterpoise in synchronism with one of said first and second counterpoises.

3. The apparatus of claim 2, wherein said unbalanced drive includes a crank mechanism having a crank arm coupling said ledger with said output member.

4. The apparatus of claim 3, wherein said crank arm includes a first portion arranged to orbit about said first axis and a second portion connected with said ledger.

5. The apparatus of claim 4, wherein said ledger includes at least one guide for the at least one rod and a flexible carrier for said at least one guide.

6. The apparatus of claim 5, wherein said carrier comprises at least one leaf spring.

7. The apparatus of claim 2, further comprising a shaft rotatable about said second axis and mounting said second counterpoise, and means for rotating said shaft in synchronism with said output member.

8. The apparatus of claim 7, wherein said means for rotating said shaft comprises an endless flexible torque transmitting element.

9. The apparatus of claim 8, wherein said torque transmitting element comprises a V-belt.

10. The apparatus of claim 2, wherein said means for orbiting said at least one further counterpoise includes a kinematic connection between said output member and said at least one further counterpoise.

11. The apparatus of claim 10, further comprising an additional shaft eccentrically mounting said at least one further counterpoise and rotatable by said output member about a further axis spaced apart from said second axis.

12. The apparatus of claim 11, wherein said further axis coincides with one of said first and second axes.

13. The apparatus of claim 12, wherein said at least one further counterpoise is arranged to orbit about said first axis and is spaced apart from said first counterpoise in the direction of said first axis.

14. The apparatus of claim 13, wherein said at least one further counterpoise is angularaly offset relative to said first counterpoise circumferentially of said first axis.

15. The apparatus of claim 2, wherein said first and second counterpoises respectively have first and second centers of gravity, said centers of gravity being disposed in a common plane.

16. The apparatus of claim 15, wherein said common plane is an at least substantially vertical plane.

17. The apparatus of claim 15, wherein said ledger comprises two at least substantially tubular guides for two discrete rods and a common flexible carrier for said guides.

18. The apparatus of claim 2, wherein said drive has a single crank member.

* * * * *